(12) United States Patent
Chen

(10) Patent No.: US 10,965,611 B2
(45) Date of Patent: Mar. 30, 2021

(54) SCHEDULER UTILIZING NORMALIZED LEAVES OF A WEIGHTED TREE

(71) Applicant: International Business Machines Corporation, Armonk, NY (US)

(72) Inventor: Yu-Ching Chen, North York (CA)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/244,686

(22) Filed: Jan. 10, 2019

(65) Prior Publication Data

US 2020/0228460 A1    Jul. 16, 2020

(51) Int. Cl.
| G06F 15/173 | (2006.01) |
| H04L 12/911 | (2013.01) |
| H04L 12/863 | (2013.01) |
| H04L 12/865 | (2013.01) |

(52) U.S. Cl.
CPC .......... H04L 47/781 (2013.01); H04L 47/623 (2013.01); H04L 47/6275 (2013.01); H04L 47/822 (2013.01); H04L 47/829 (2013.01)

(58) Field of Classification Search
CPC . H04L 47/781; H04L 47/623; H04L 47/6275; H04L 47/829; H04L 47/822
See application file for complete search history.

(56) References Cited

U.S. PATENT DOCUMENTS 6,556,578 B1 * 4/2003 Silberschatz ........... H04L 47/10
370/234
7,453,804 B1 * 11/2008 Feroz .................... H04L 43/026
370/230

FOREIGN PATENT DOCUMENTS

| CN | 106980623 A | 1/2016 |
| CN | 105975797 A | 5/2016 |
| CN | WO2018182442 A1 | 10/2018 |

OTHER PUBLICATIONS

Sun, Zejun, et al., "Identifying Influential Nodes in Complex Networks Based on Weighted Formal Concept Analysis," IEEE Access, 10.1109/ACCESS.2017.2679038, Mar. 7, 2017.

* cited by examiner

*Primary Examiner* — Padma Mundur

(74) *Attorney, Agent, or Firm* — Nelson and Nelson; Daniel P. Nelson

(57) ABSTRACT

A method for normalizing leaf nodes of a weighted tree for use in a scheduler is disclosed. In one embodiment, such a method includes obtaining a weighted tree structure having a root node and multiple downstream nodes. Each downstream node is assigned a weight value. The method assigns a global maximum number and a global minimum number to the root node. The method derives, from the weight values and the global maximum number and global minimum number, a maximum number and a minimum number for each downstream node. The method further assigns, to each leaf node of the downstream nodes, an absolute weight value that is related to at least one of its maximum number and its minimum number. The method schedules items associated with the leaf nodes based on the absolute weight values associated with the leaf nodes. A corresponding system and computer program product are also disclosed.

17 Claims, 6 Drawing Sheets

SCHEDULER UTILIZING NORMALIZED LEAVES OF A WEIGHTED TREE

BACKGROUND

Field of the Invention

This invention relates to systems and methods to normalize leaf nodes of a weighted tree for use in schedulers and other similar components.

Background of the Invention

A tree structure is a structure made up of a hierarchy of nodes. The top-level node is typically referred to as the root node. A node is a structure within the tree that represents an item. A parent-child relationship exists where one node is connected to another node and is upstream or downstream from the other relative to the root node. A leaf node is a node without any child nodes. Two nodes are considered sibling nodes if they have the same parent node. A weighted tree structure is a tree structure where each node in the tree is assigned a weight value. These weight values may indicate the importance of certain nodes relative to their sibling nodes.

In a weighted tree, leaf nodes typically have no relation to nodes that are not its siblings. As a result, leaf nodes typically cannot be directly compared if they reside in different sub-trees of the tree structure. For example, FIG. 2 shows a tree structure 200a comprising a root node 202a, intermediate nodes 202b, 202c, and leaf nodes 202d, 202e, 202f. The intermediate nodes 202b, 202c and the leaf nodes 202d-f each have the illustrated weight values. Leaf node 202d cannot be directly compared to leaf node 202f because they reside in different sub-trees 204a, 204b of the tree structure 200a. Even though the leaf node 202d has a weight value that is less than that of the leaf node 202f, the parent node 202b of the leaf node 202d has a weight value that is larger than that of the parent node 202c. Thus, because of the different weights of their parents, the weights of the leaf nodes 202d-f cannot be directly compared to one another to determine the relative importance of the leaf nodes 202d-f.

In view of the foregoing, what are needed are systems and methods to enable leaf nodes of a weighted tree structure to be directly compared with one another, even when the leaf nodes are in different sub-trees of the weighted tree structure. Ideally, such systems and methods will be useful in components such as schedulers to directly compare and prioritize leaf nodes in a weighted tree structure.

SUMMARY

The invention has been developed in response to the present state of the art and, in particular, in response to the problems and needs in the art that have not yet been fully solved by currently available systems and methods. Accordingly, systems and methods in accordance with the invention have been developed to normalize leaf nodes of weighted tree structures for use in schedulers and other components that prioritize items. The features and advantages of the invention will become more fully apparent from the following description and appended claims, or may be learned by practice of the invention as set forth hereinafter.

Consistent with the foregoing, a method for normalizing leaf nodes of a weighted tree for use in a scheduler is disclosed. In one embodiment, such a method includes obtaining a weighted tree structure having a root node and multiple downstream nodes. Each downstream node is assigned a weight value. The method assigns a global maximum number and a global minimum number to the root node. The method derives, from the weight values and the global maximum number and global minimum number, a maximum number and a minimum number for each downstream node. The method further assigns, to each leaf node of the downstream nodes, an absolute weight value that is related to at least one of its maximum number and its minimum number. The method schedules items associated with the leaf nodes based on the absolute weight values associated with the leaf nodes.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
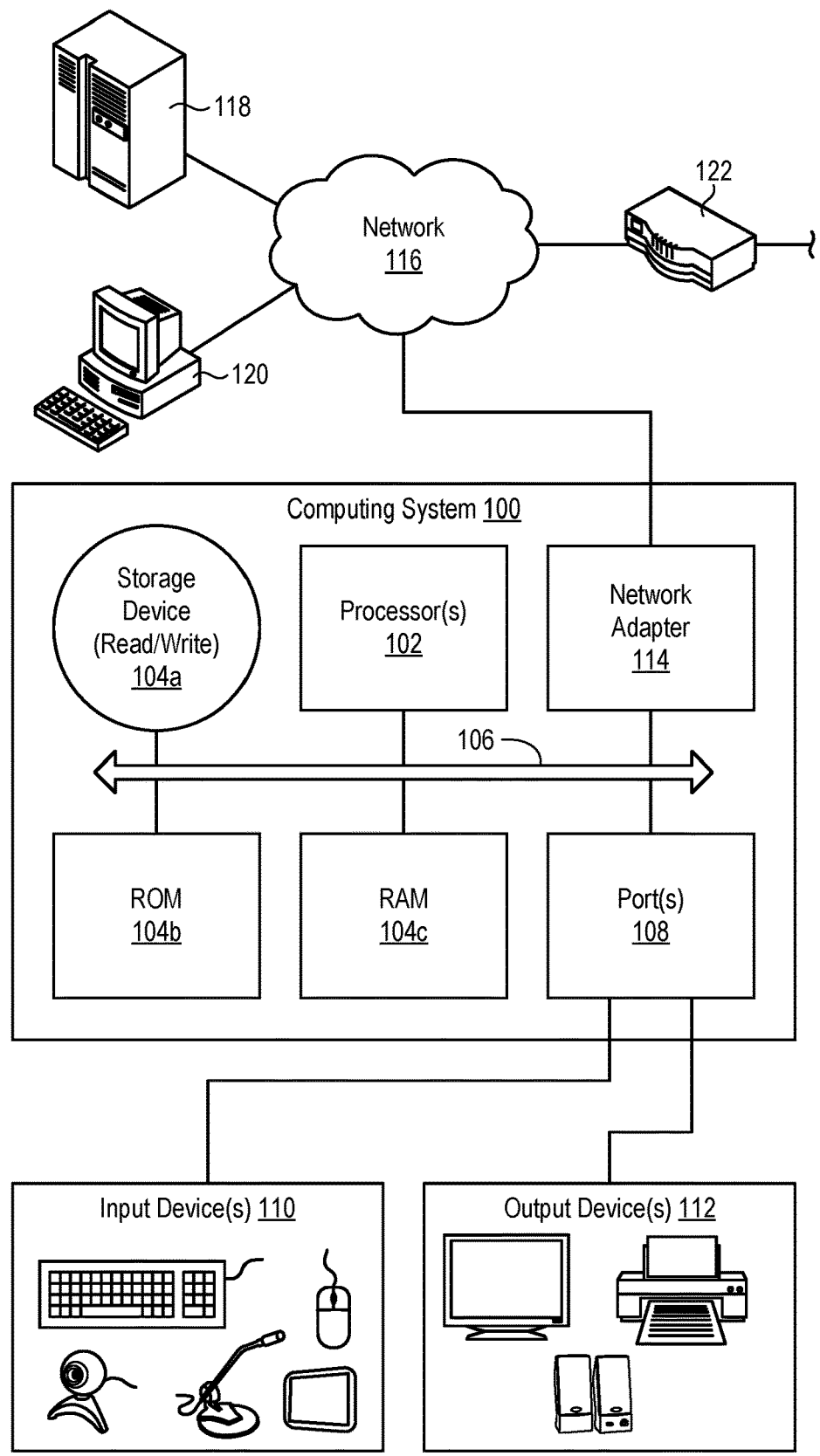
FIG. 1 is a high-level block diagram showing one example of a computing system for use with embodiments of the invention.
Figure 2:
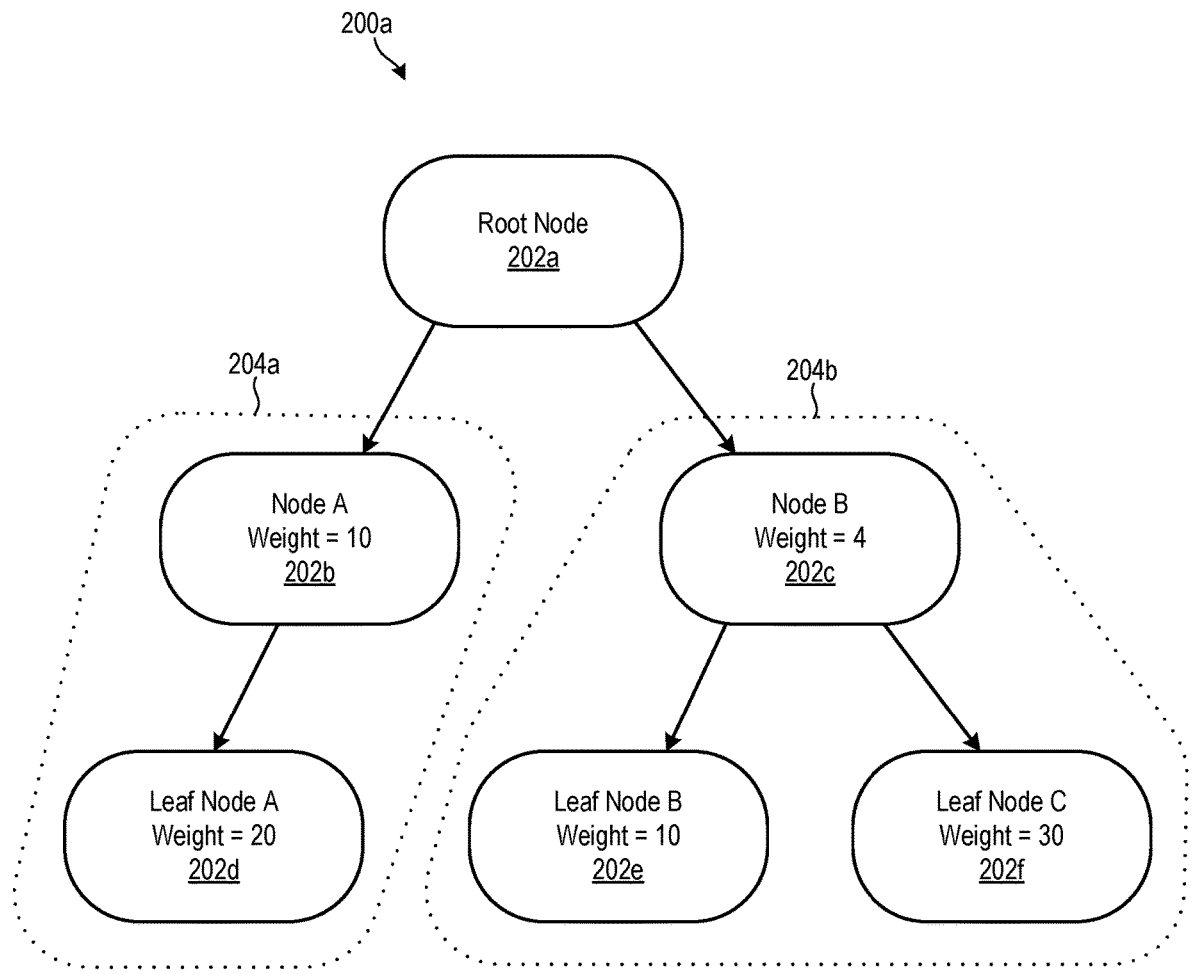
FIG. 2 is a first example of a weighted tree structure.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, a storage controller, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a local area network (LAN), wide area network (WAN), storage area network (SAN), or the Internet. Such a network 116 may enable the computing system 100 to connect to or communicate with one or more servers 118, workstations 120, personal computers 120, mobile computing devices, or other devices. The network 116 may also enable the computing system 100 to connect to or communicate with another network by way of a router 122 or other device 122. Such a router 122 may allow the computing system 100 to communicate with servers, workstations, personal computers, or other devices located on different networks.

Figure 3:
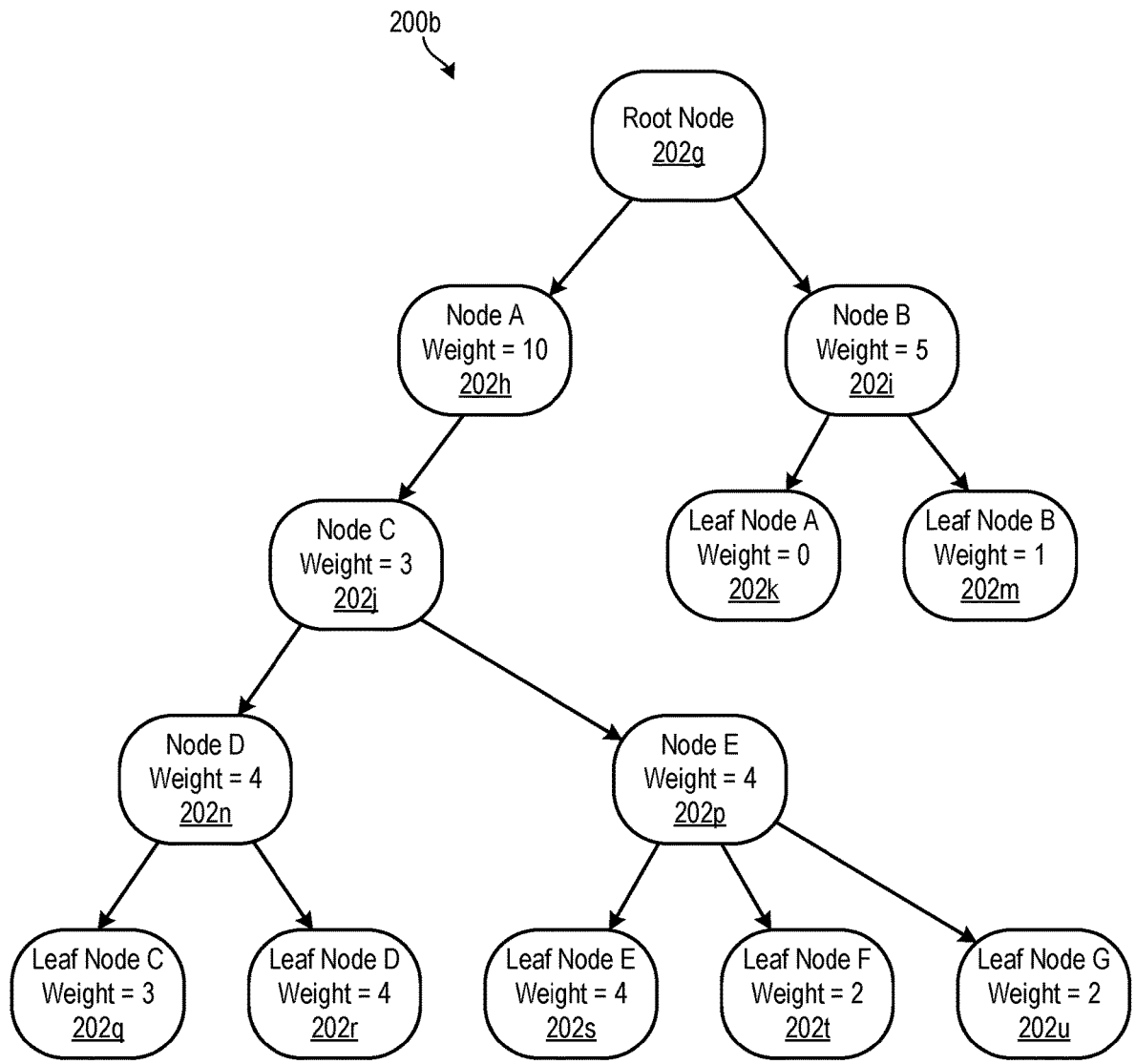
FIG. 3 is a second example of a weighted tree structure.

Referring to FIG. 3, as previously mentioned, in a weighted tree structure 200, leaf nodes 202 typically have no relation to nodes 202 that are not its siblings. Unfortunately, leaf nodes 202 typically cannot be directly compared to one another if they reside in different sub-trees 204 of the weighted tree structure 200. Thus, systems and methods are needed to enable leaf nodes 202 of a weighted tree structure 200 to be directly compared to one another, even when the leaf nodes 202 reside in different sub-trees 204 of the weighted tree structure 200. Ideally, such systems and methods will be useful in components such as schedulers to directly compare and prioritize leaf nodes 202 in a weighted tree structure 200.

The disclosed systems and methods enable leaf nodes 202 of a weighted tree structure 200 to be directly compared to one another. In general, the disclosed systems and methods accomplish this by calculating an absolute weight value for each leaf node 202 of a weighted tree structure 200. The leaf nodes 202 may then be directly compared with one another by comparing their absolute weight values.

In general, the disclosed systems and methods obtain a weighted tree structure 200 comprising a root node 202 and a plurality downstream nodes 202, where each downstream node 202 is assigned a weight value. Each node 202 may correspond to an item, such as a job, person, etc., that needs to be prioritized and/or scheduled.

The disclosed systems and methods assign a global maximum number and a global minimum number to the root node 202. In certain embodiments, the global maximum number and global minimum number are arbitrarily selected. The disclosed systems and methods then derive, from the weight values and the global maximum number and global minimum number, a maximum number and minimum number for each downstream node 202. The maximum number and minimum number of each node 202 may be within the range of the global maximum number and global minimum number of the root node 202, as well as the range of the maximum number and minimum number of its parent node 202. In certain embodiments, the disclosed systems and methods assign, to equally weighted sibling nodes 202 in the weighted tree structure 200, identical maximum numbers and identical minimum numbers. Similarly, the disclosed systems and methods may assign, to unequally weighted sibling nodes 202 in the weighted tree structure 200, different maximum numbers and different minimum numbers.

Once the maximum numbers and minimum numbers are determined for each leaf node 202 in the weighted tree structure 200, the disclosed systems and methods may assign, to each leaf node 202 of the weighted tree structure 200, an absolute weight value that is related to (e.g., equal) to at least one of its maximum number and minimum number. Using these absolute weight values, the disclosed systems and methods may schedule and/or prioritize items associated with the leaf nodes 202.

FIG. 3 shows one embodiment of a weighted tree structure 200b that includes multiple nodes 202g-u. As shown, the weighted tree structure 200b includes a root node 202g and multiple downstream nodes 202g-u that are each assigned a weight value. The weighted tree structure 200b further includes leaf nodes 202k, 202m, 202q-u, which are in different sub-trees of the weighted tree structure 200.

Figure 4:
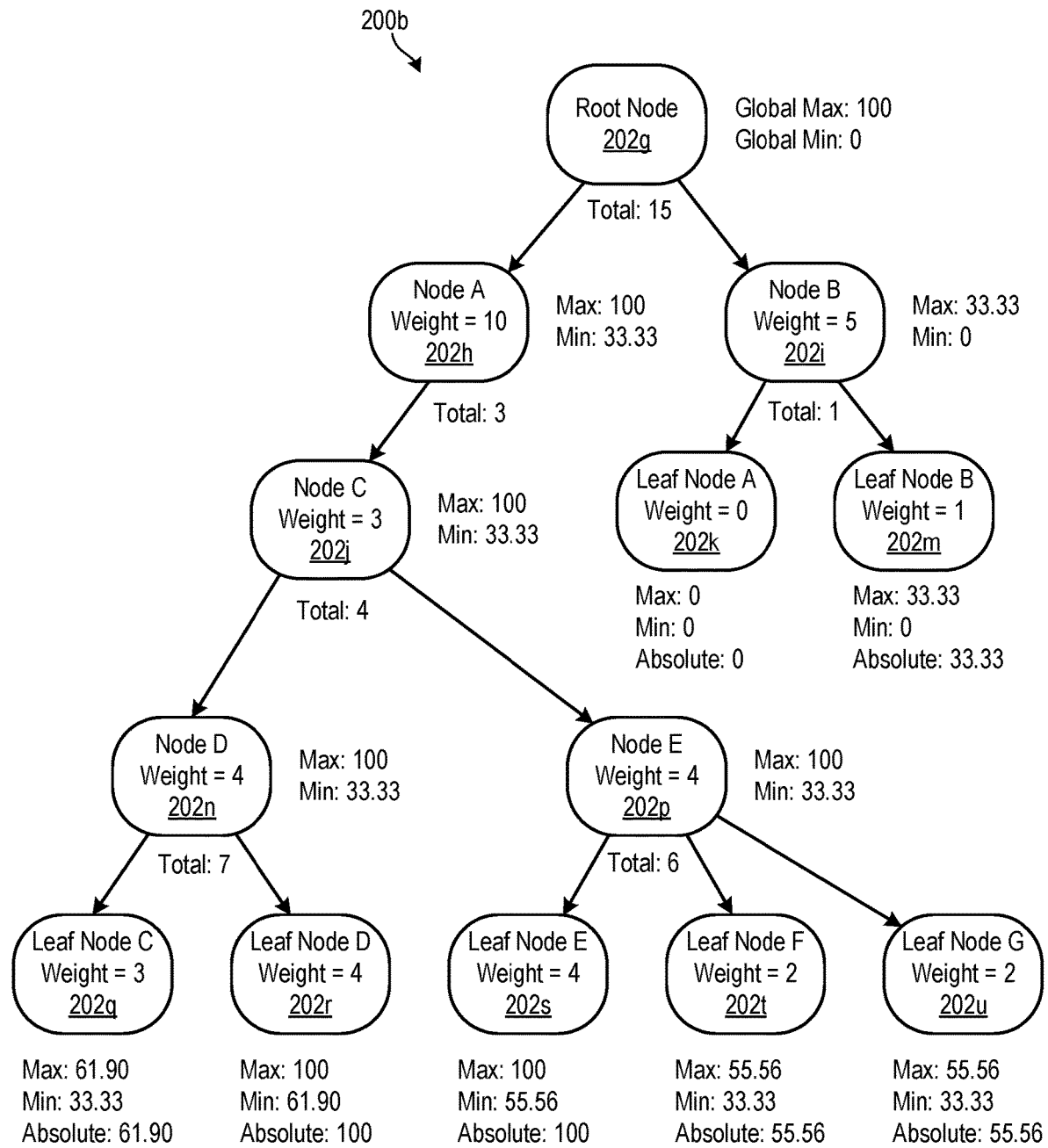
FIG. 4 shows the weighted tree structure of FIG. 3 after applying the method of FIGS. 5 and 6.

FIG. 4 shows the weighted tree structure 200b of FIG. 3 after applying the disclosed systems and methods. As shown, using the disclosed systems and methods, the root node 202g may be initially assigned a global maximum number and global minimum number. In this example, the global maximum number is selected to be one hundred and the global minimum number is selected to be zero. The maximum number and minimum number of all nodes 202 in the weighted tree structure 200 will fall within the range of the global maximum number and the global minimum number. In certain embodiments, the global maximum number and global minimum number are selected arbitrarily.

Below the root node 202g, the disclosed method takes the weights of the intermediate nodes 202h, 202i and divides up the range of the root node 202 in proportion to the weights. The total of the weights is 10+5=15. The "total" for the root node 202g, which is the sum of the weights of its uniquely-weighted children 202h, 202i, is illustrated below the root node 202g. The intermediate node 202h receives 10/15 of the range of the root node 202 and the intermediate node 202i receives 5/15 of the range of the root node 202. Thus, the intermediate node 202h with the largest weight receives the larger portion of the range of the root node 202g. After applying the formula described above, the intermediate node 202h is assigned a maximum number of 100 and a minimum number of 33.33, and the intermediate node 202i is assigned a maximum number of 33.33 and minimum number of 0.

This process is applied to the remaining nodes 202 of the weighted tree structure 200b. For example, the intermediate node 202j receives the full range of its parent node 202h since it is the only child node 202j of the parent node 202h. Thus, its maximum number is 100 and its minimum number is 33.33, which is the same as its parent node 202h.

The illustrated weighted tree structure 200b also shows how the disclosed method is applied to child nodes 202 having the same weight values. For example, consider the child node 202n and the child node 202p, which have the same weight value of 4. The "total" for the parent node 202j, which is the sum of the weights of its uniquely-weighted children 202n, 202p, is illustrated below the parent node 202j (in this example, the total is 4 since each child node 202n, 202p has the same weight). In this case, each child node 202n, 202p is assigned the same maximum number and minimum number of its parent node 202j. Because the parent node 202j has a maximum number of 100 and a minimum number of 33.33, and there are no other siblings of the same-weighted child nodes 202n, 202p, each child node 202n, 202p is assigned the full range of the parent node 202j. Thus, each child node 202n, 202p is assigned a maximum number of 100 and a minimum number of 33.33, as shown in FIG. 4.

The illustrated weighted tree structure 200b also shows how the disclosed method applies to child nodes 202 having the same weight value while also having at least one sibling node 202. For example, the parent node 202p has three child nodes 202s-u. Two of the child nodes 202t, 202u have the same weight value of 2. The other child node 202s has a different weight value of 4. The "total" for the parent node 202p, which is the sum of the weights of its uniquely-weighted child nodes 202s-u, is illustrated below the parent node 202p. In this example, the weight values sum to 6 (one of the weight values of 2 is ignored since it is the same as another child node 202). The child nodes 202s-u may then be assigned a maximum number and minimum number in proportion to their weight values. Thus, the child node 202s may be assigned a maximum number of 100 and a minimum number of 55.56, and the child nodes 202t, 202u may be assigned a maximum number of 55.56 and a minimum number of 33.33. These numbers are within the range of the parent node 202p.

As shown, once the maximum number and minimum number are calculated for each of the leaf nodes 202k, 202m, 202q-u, an absolute weight value may be calculated for each of the leaf nodes 202k, 202m, 202q-u. In certain embodiments, the absolute weight value is equal to the leaf node's maximum number. Once calculated, the absolute weight values enable the leaf nodes 202k, 202m, 202q-u to be directly compared to one another (including leaf nodes 202 from different sub-trees 204) and enable the leaf nodes 202k, 202m, 202q-u to be prioritized relative to one another. For example, if the leaf nodes 202k, 202m, 202q-u represent jobs, the jobs may be scheduled for execution in the order of their absolute weight values (i.e., priorities). Jobs having the same absolute weight values may have the same priorities and thus be executed in any order relative to one another.

In another example, if the leaf nodes 202k, 202m, 202q-u represent people in a hotel booking system, the people may be prioritized in order of their absolute weight values. For example, if a scheduling system needs to determine which person receives higher priority for purposes of hotel booking, the people may be represented by the leaf nodes 202, and the companies they work for may be represented by parent nodes 202 of the leaf nodes 202. In such an application, the weight of a company may correspond to how many times the company previously booked the hotel. The weight of the people may correspond to their job title within their companies. Using the disclosed systems and methods, people from more loyal companies may be served first, and higher-titled people in more loyal companies may be served prior to lower-titled people in the same companies. The disclosed systems and methods may also enable choosing people from any company of companies that have the same weight.

Figure 5:
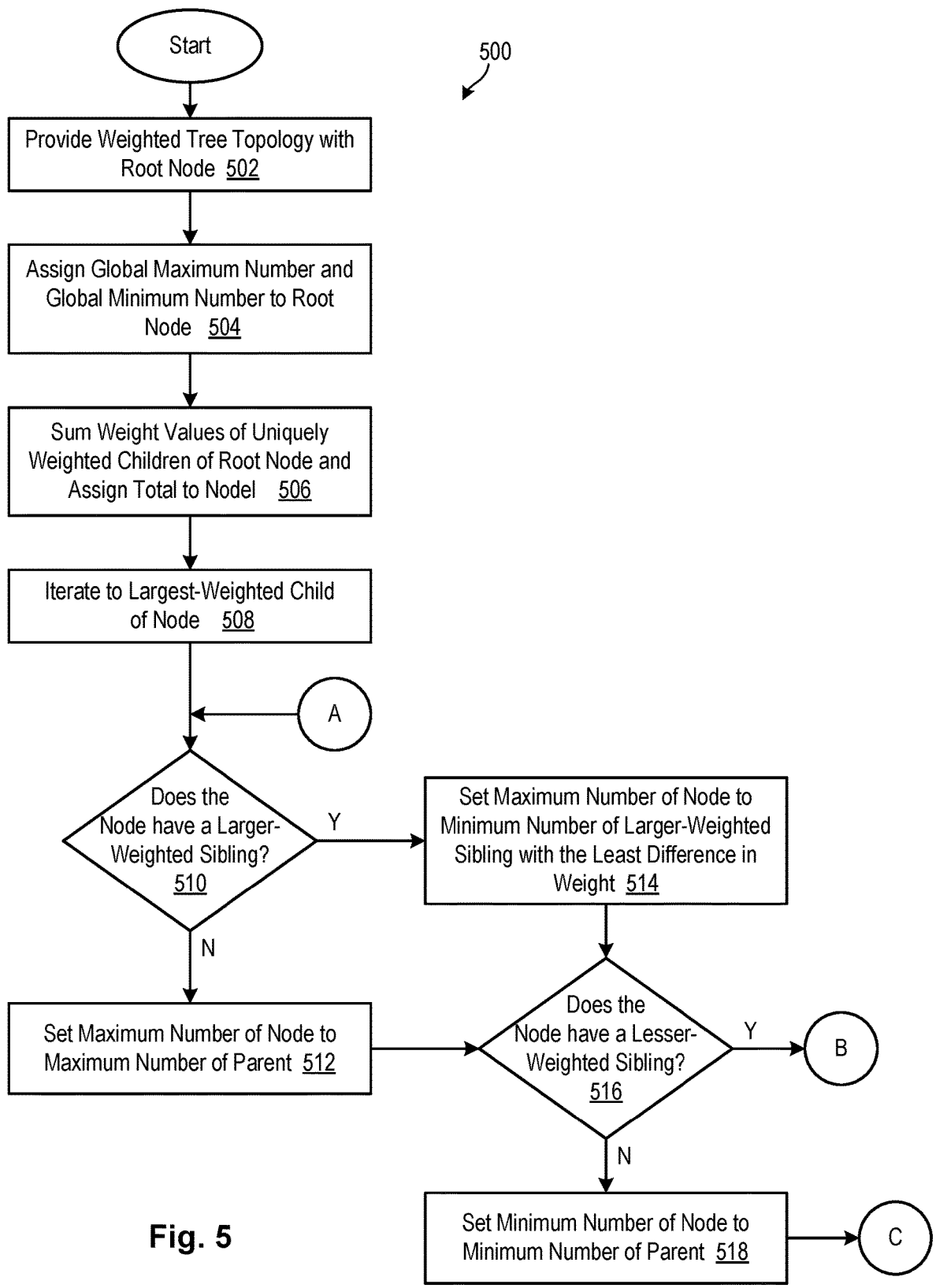
FIGS. 5 and 6 show one embodiment of a method for normalizing leaf nodes of a weighted tree structure.
Figure 6:
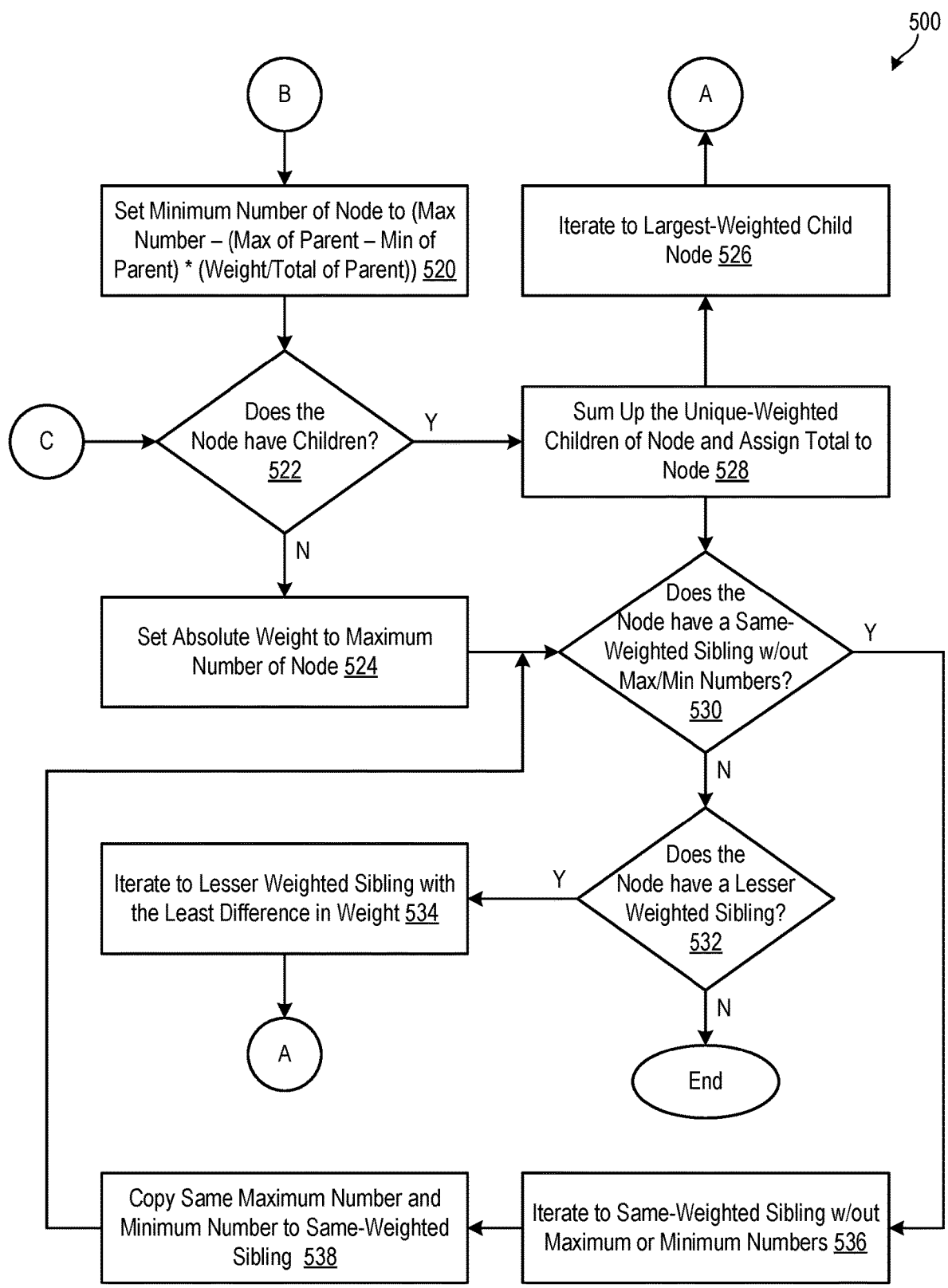

Referring to FIGS. 5 and 6, one embodiment of a method 500 for normalizing leaf nodes 202 in a weighted tree structure 200 is illustrated. Such a method 500 may achieve a result that is the same or similar to that illustrated in FIG. 4. As shown, the method 500 initially provides 502 a weighted tree structure 200 having a root node 202 and one or more downstream nodes 202. The method 500 then assigns 504 a global maximum number and global minimum number to the root node 202. The weight values of uniquely-weighted child nodes 202 of the root node 202 may then be summed 506 and assigned to the root node 202 as a "total."

The method 500 then iterates 508 to the child node 202 with the largest weight. At this point, the method 500 determines 510 whether the child node 202 has any sibling node with a larger weight. If not, the method 500 sets 512 the maximum number of the node 202 to the maximum number of the parent node 202.

If, at step 510, the method 500 determines that the node 202 does have a sibling node 202 with a larger weight, the method 500 sets 514 the maximum number of the node 202 to the minimum number of the larger-weighted sibling node 202 with the least difference in weight.

After completing step 512 or step 514, the method 500 determines 516 whether the node 202 has a lesser-weighted sibling node 202. If not, the method 500 sets 518 the minimum number of the node 202 to the minimum number of the parent node 202.

If, at step 516, the node 202 does have a lesser-weighted sibling node 202, the method 500 sets 520 the minimum number of the node 202 to the following: (maximum number of the node 202−(maximum number of the parent node 202−minimum number of the parent node 202)*(weight of the node 202/total of the parent node 202). The method 500 then determines 522 whether the node 202 has any children. If so, the method 500 sums 528 the weights of the uniquely-weighted children of the node 202 and assigns the total to the node 202. At this point, the method 500 iterates 526 to the largest-weighted child node 202 of the node 202 and the method 500 returns to decision step 510. The method 500 also proceeds to step 530 in parallel.

If, at step 522, the node 202 does not have any child nodes 202 (i.e., the node 202 is a leaf node 202), the method 500 sets 524 the absolute weight value of the node 202 to the maximum number of the node 202. The method 500 then determines 530 whether the node 202 has any same-weighted sibling nodes 202 that have not been assigned maximum and minimum numbers. If so, the method 500 iterates 536 to the same-weighted sibling node 202 without maximum and minimum numbers, copies 538 the same maximum number and minimum number to the same-weighted sibling node 202, and the method 500 returns to the decision step 530.

If, at step 530, the node 202 does not have a same-weighted sibling node 202 without maximum and minimum numbers, the method 500 determines 532 whether the node 202 has a lesser weighted sibling node 202. If not, the method 500 ends. If so, the method 500 iterates 534 to the lesser-weighted sibling node 202 with the least difference in weight and the method 500 returns to decision step 510.

The method 500 illustrated in FIGS. 5 and 6 may be performed recursively and in parallel to process nodes 202 in the weighted tree structure 200. The method 500 may be performed for a weighted tree structure 200 of virtually any depth or structure as long as it propagates from a single root node 202. The method 500 will produce normalized absolute weight values for leaf nodes 202 between the global maximum number and global minimum number of the root node 202.

The method 500 is presented by way of example and not limitation. Other variations are possible and within the scope of the invention. For example, in certain embodiments, the method 500 may be modified to enable counting of equally-weighted siblings. This will guarantee that all nodes 202 in the weighted tree structure 200 have different absolute weight values, even leaf nodes 202 with the same weight value that are in the same sub-tree 204. This will prioritize certain leaf nodes 202 over other leaf nodes 202 in the same sub-tree 204 even though they have the same weight value.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for normalizing leaf nodes of a weighted tree for use in a scheduler, the method comprising:
   receiving, by a scheduler, a plurality of items that need to be prioritized, wherein the items include at least one of jobs and people;
   performing, by the scheduler, the following steps in order to prioritize the items:
   obtaining a weighted tree structure comprising a root node and a plurality downstream nodes, wherein each downstream node is assigned a weight value;
   assigning a global maximum number and a global minimum number to the root node;
   deriving, from the weight values and the global maximum number and global minimum number, a maximum number and a minimum number for each downstream node;
   assigning, to each leaf node of the downstream nodes, an absolute weight value that is related to at least one of its maximum number and its minimum number, wherein the absolute weight value is not in all cases proportional to the leaf node's weight value; and
   prioritizing, by the scheduler, the items based on the absolute weight values associated with the leaf nodes; and
   scheduling the items associated with the leaf nodes in order of their absolute weight values.

2. The method of claim 1, wherein the maximum number and minimum number for each downstream node is within the maximum number and minimum number of the downstream node's parent node.

3. The method of claim 1, further comprising assigning, to equally weighted sibling nodes in the weighted tree structure, identical maximum numbers and identical minimum numbers.

4. The method of claim 1, further comprising assigning, to unequally weighted sibling nodes in the weighted tree structure, different maximum numbers and different minimum numbers.

5. The method of claim 1, further comprising arbitrarily selecting the global maximum number and the global minimum number.

6. The method of claim 1, wherein each leaf node in the weighted tree structure has a maximum number and a minimum number that is within the global maximum number and the global minimum number of the root node.

7. A computer program product for normalizing leaf nodes of a weighted tree for use in a scheduler, the computer program product comprising a computer-readable storage medium having computer-usable program code embodied therein, the computer-usable program code configured to perform the following when executed by at least one processor:
   receive, by a scheduler, a plurality of items that need to be prioritized, wherein the items include at least one of jobs and people;
   perform, by the scheduler, the following steps in order to prioritize the items:
   obtain a weighted tree structure comprising a root node and a plurality downstream nodes, wherein each downstream node is assigned a weight value;
   assign a global maximum number and a global minimum number to the root node;
   derive, from the weight values and the global maximum number and global minimum number, a maximum number and a minimum number for each downstream node;
   assign, to each leaf node of the downstream nodes, an absolute weight value that is related to at least one of its maximum number and its minimum number, wherein the absolute weight value is not in all cases proportional to the leaf node's weight value; and
   prioritize, by the scheduler, the items associated with the leaf nodes based on the absolute weight values associated with the leaf nodes; and
   schedule the items associated with the leaf nodes in order of their absolute weight values.

8. The computer program product of claim 7, wherein the maximum number and minimum number for each downstream node is within the maximum number and minimum number of the downstream node's parent node.

9. The computer program product of claim 7, wherein the computer-usable program code is further configured to assign, to equally weighted sibling nodes in the weighted tree structure, identical maximum numbers and identical minimum numbers.

10. The computer program product of claim 7, wherein the computer-usable program code is further configured to assign, to unequally weighted sibling nodes in the weighted tree structure, different maximum numbers and different minimum numbers.

11. The computer program product of claim 7, wherein the computer-usable program code is further configured to arbitrarily select the global maximum number and the global minimum number.

12. The computer program product of claim 7, wherein each leaf node in the weighted tree structure has a maximum number and a minimum number that is within the global maximum number and the global minimum number of the root node.

13. A system for normalizing leaf nodes of a weighted tree for use in a scheduler, the system comprising:
   at least one processor;
   at least one memory device operably coupled to the at least one processor and storing instructions for execution on the at least one processor, the instructions causing the at least one processor to:
   receive, by a scheduler, a plurality of items that need to be prioritized, wherein the items include at least one of jobs and people;
   perform, by the scheduler, the following steps in order to prioritize the items:
   obtain a weighted tree structure comprising a root node and a plurality downstream nodes, wherein each downstream node is assigned a weight value;
   assign a global maximum number and a global minimum number to the root node;
   derive, from the weight values and the global maximum number and global minimum number, a maximum number and a minimum number for each downstream node;
   assign, to each leaf node of the downstream nodes, an absolute weight value that is related to at least one of its maximum number and its minimum number, wherein the absolute weight value is not in all cases proportional to the leaf node's weight value;

prioritize, by the scheduler, the items associated with the leaf nodes based on the absolute weight values associated with the leaf nodes; and schedule the items associated with the leaf nodes in order of their absolute weight values.

14. The system of claim 13, wherein the maximum number and minimum number for each downstream node is within the maximum number and minimum number of the downstream node's parent node.

15. The system of claim 13, wherein the instructions further cause the at least one processor to assign, to equally weighted sibling nodes in the weighted tree structure, identical maximum numbers and identical minimum numbers.

16. The system of claim 13, wherein the instructions further cause the at least one processor to assign, to unequally weighted sibling nodes in the weighted tree structure, different maximum numbers and different minimum numbers.

17. The system of claim 13, wherein the instructions further cause the at least one processor to arbitrarily select the global maximum number and the global minimum number.

\* \* \* \* \*